United States Patent
Eickhoff

(10) Patent No.: US 9,751,642 B2
(45) Date of Patent: Sep. 5, 2017

(54) MULTIFUNCTIONAL CONTROLLER FOR A SATELLITE

(71) Applicant: Astrium GmbH, Taufkirchen (DE)

(72) Inventor: Jens Eickhoff, Immenstaad (DE)

(73) Assignee: Astrium GmbH, Taufkirchen (DE)

( * ) Notice: Subject to any disclaimer, the term of this patent is extended or adjusted under 35 U.S.C. 154(b) by 0 days.

(21) Appl. No.: 13/892,376

(22) Filed: May 13, 2013

(65) Prior Publication Data

US 2013/0299642 A1    Nov. 14, 2013

(30) Foreign Application Priority Data

May 14, 2012    (DE) .......................... 10 2012 009 513

(51) Int. Cl.
*B64G 1/24*    (2006.01)
*B64G 1/44*    (2006.01)
*H04B 7/185*    (2006.01)

(52) U.S. Cl.
CPC ............... *B64G 1/24* (2013.01); *B64G 1/443* (2013.01); *H04B 7/18515* (2013.01)

(58) Field of Classification Search
CPC .. B64G 1/24; B64G 1/443; H02K 7/02; G06F 11/00
See application file for complete search history.

(56) References Cited

U.S. PATENT DOCUMENTS

| | | | | |
|---|---|---|---|---|
| 4,654,846 A | * | 3/1987 | Goodwin | G05D 1/0077 700/82 |
| 5,502,812 A | * | 3/1996 | Leyre et al. | 714/10 |
| 6,137,171 A | * | 10/2000 | Joshi | 257/723 |
| 2008/0297120 A1 | * | 12/2008 | Potter et al. | 322/4 |
| 2013/0185460 A1 | * | 7/2013 | Bobak | G06F 3/00 710/15 |

FOREIGN PATENT DOCUMENTS

DE        698 33 273 T2    9/2006

* cited by examiner

*Primary Examiner* — Todd Melton
*Assistant Examiner* — Jason Roberson
(74) *Attorney, Agent, or Firm* — Crowell & Moring LLP

(57) ABSTRACT

A multifunctional controller merges certain functions of an onboard computer (OBC) and a power supply unit (PCDU) of a satellite. The controller includes reconfiguration functions for monitoring the correct functioning of components of an onboard computer of the satellite and for switching over between redundant components and/or turning off electrical loads of the satellite in the event of a malfunction. The controller also includes control functions for controlling and distributing energy to satellite components, which is designed for turning on and off the power supply to satellite components together with the reconfiguration unit.

20 Claims, 3 Drawing Sheets

MULTIFUNCTIONAL CONTROLLER FOR A SATELLITE

CROSS-REFERENCE TO RELATED APPLICATIONS

The present application claims priority under 35 U.S.C. §119 to German Patent Application No. 10 2012 009 513.9, filed May 14, 2012, the entire disclosure of which is herein expressly incorporated by reference.

BACKGROUND AND SUMMARY OF THE INVENTION

The invention relates to a multifunctional controller for a satellite.

In satellite technology, key components pertaining to control and safety on board a satellite are generally designed in a redundant manner to prevent a total failure of the satellite should a module or components fail. The internal components in the onboard computer (OBC) and in the power control and distribution unit (PCDU) of a satellite are therefore designed in a particularly redundant manner since a component failure in these units can result in the total malfunction of the satellite.

The OBC controls important functions of the satellite and runs the onboard software (OBSW) to do so. It receives the required commands for this via ground-based radio via an antenna and transceiver and a decoder board that transforms the digital signals of the transceiver back into data packets and forwards them to the OBSW on the CPU of the OBC (cf. FIG. 1). The PCDU controls the components' supply of electrical energy from the solar panel and the battery of the satellite. For example, to operate a payload of the satellite, the OBSW actuates a controller of the PCDU that closes a corresponding switch to supply the payload with electrical energy. As soon as the payload is activated, it can be controlled by the OBC. Data regarding the payload can then be recorded, analyzed, and transmitted by the OBSW to a ground station via telemetry. The redundant construction of key components that are part of such a complex sequence control system, prevents a total failure of the satellite due to various malfunctions, such as malfunctions on data buses, software errors, or insufficient power supply.

In addition, the PCDU and the OBC are the high-availability components on board of each satellite. The current control and emergency shutdown of equipment must function in every fault incident. The automatic power supply to the OBC and the booting of the OBC must also function reliably after a voltage loss in the satellite as soon as the satellite receives enough power again from the solar panels in the sun-phase of the orbit. In the OBC, it must be possible in all cases, including after a software crash or hardware failure of a component, e.g., CPU, data bus controller, or memory board, to switch over to the corresponding redundant component.

To enable these switchovers, all of the internal OBC constructional components are each wired in a cross-wise manner (also known as cross-coupling) so that, e.g., CPU A can serve both data bus controllers A and B and both memory modules Memory A and B (cf. again FIG. 1). The same applies for CPU B. The same cross-coupling principle applies for the elements within the PCDU.

Within the OBC and the PCDU the reconfiguration units and the PCDU controllers are two key elements for emergency operation input commands issued from the ground. The reconfiguration units execute the redundancy switchovers in the OBC. To do so, they must receive the corresponding commands. These can come from the OBSW if it has detected errors (cf. dashed line connections between the CPUs and reconfiguration units in FIG. 1). In the event of a crashed OBSW or a defective CPU, special reconfiguration commands can also be sent from the ground via transceivers and decoder boards to the reconfiguration units. Via a special sub-module of the reconfiguration units known as a command pulse decoding unit (CPDU), emergency commands can also be sent from the ground to the PCDU controllers for the emergency shutdown of redundant loads or to activate other electric circuits. These CPDU commands (also known as high-priority Class 1 or HPC1 commands) run via the dotted connections depicted in FIG. 1.

In this way, the OBC and PCDU have three standardized types of interfaces: data bus connections, power connections from the PCDU to the OBC, and the so-called CPDU emergency command lines from the OBC to the PCDU.

However, the implementation outlay for the required division of functions of the components involved in the reconfiguration is high. In addition, the test outlay increases since each of these high-reliability components must be subjected to time-consuming tests. Therefore, one of the problems addressed by the present invention involves a lower cost arrangement.

The multifunctional controller according to the present invention combines the two highly critical components, namely the reconfiguration unit and the PCDU controller for controlling and distributing power to satellite components, in a single chip, whereby the implementation costs for a satellite control and safety device can be reduced. By combining these two units, the module described as a combined controller in FIG. 3 can jointly implement various safety and control functions in the OBC/PCDU architecture, in particular the monitoring of the power supply, the turning on and off of the power supply of satellite components as well as the switchover between redundant components in the PCDU and/or OBC. Reconfigurations can still be triggered by the OBSW or the ground via the decoder boards.

The multifunctional controller can be implemented as an Application Specific Integrated Circuit (ASIC) or Field-Programmable Gate Array (FPGA). The multifunctional controller generally requires lower design and test costs than a solution consisting of individual components as is used in conventional satellites, since only one ASIC or FPGA module must be developed or only one firmware must be developed for a microcontroller. Accordingly, the component testing expenses also decrease. In addition, complex system tests for the interaction of the two units combined in the multifunctional controller can be simplified.

An embodiment of the invention is directed to a multifunctional controller for a satellite that has the following: a reconfiguration unit or reconfiguration functions for reconfiguring components of the onboard computer and/or turning off electrical loads of the satellite in the event of a fault, and a unit for controlling and distributing power to satellite components or control functions for controlling the distribution of energy to satellite components.

The reconfiguration functions can also allow one to trigger power resets and/or soft reset commands for reconfiguring components of the onboard computer and issue them to the corresponding components. Soft resets are issued to CPUs.

The multifunctional controller can—like a typical reconfiguration unit—have inputs for triggering reconfiguration functions when receiving corresponding commands. For example, via these inputs, trigger signals from the onboard computer can be received by means of which the onboard computer requests certain modules to be reconfigured, for example in the event of a sporadic interruption of a bus controller or the switchover to a redundant module when a module, such as a memory module, is functioning incorrectly.

Furthermore, the controller can have and implement inputs for monitoring signals from the onboard computer to execute a reconfiguration of the corresponding components of the onboard computer when a monitoring signal is missing. The monitoring signals may originate from watchdog circuits that are, for example, integrated in modules and components of the onboard computer and monitor their function.

To do so, the watchdog circuits transmit monitoring signals when modules or components function error-free. If no cyclic monitoring signal from a certain component is received by the controller, the reconfiguration unit can identify the corresponding components and initiate reconfiguration tailored to these components via a corresponding signal that is issued to the affected components.

In addition, the controller can have inputs for commands from decoder modules for the hardware reconfiguration of the onboard computer and/or the emergency shutdown of electrical loads of the satellite and/or electrical switchovers. These inputs can be designed in such a manner that, for example, they forward these commands directly to the controller, which then, for example, triggers a hardware reconfiguration of the onboard computer and/or actuates the unit for controlling and distributing energy in such a way that it executes an emergency shutdown for corresponding electrical loads to conserve the electrical power supply pertaining to satellites.

Lastly, the typical function of a PCDU controller to monitor components regarding the electrical power supply of the satellite can be implemented in the combined controller to turn off electrical satellite components receiving a shortage of electrical energy as detected by the monitoring system and/or after such a shutdown, to successively supply satellite components with electrical energy when the monitoring system determines there is sufficient power. To this end, the combined controller may have inputs for monitoring the components for supplying electrical power to the satellite and be designed in such a way to turn off electric satellite components when monitoring determines there is an insufficient supply of electrical energy and/or after such a shutdown, to successively supply satellite components with electrical energy when the monitoring system determines there is sufficient power.

For example, electrical voltages may be monitored by electrical energy sources such as a solar panel and/or a battery of the satellite. If monitoring determines that the supply of electrical energy is no longer sufficient for the satellite components, some or all satellite components may be turned off. After a failure of the power supply in the satellite, for example when it is in the shadow of the Earth and the battery energy is no longer sufficient for the power supply, successive satellite components can be placed back into operation upon exceeding a certain voltage threshold when, for example, the satellite re-emerges out of the shadow of the Earth—preferably the controller first, then the onboard computer, satellite position control devices and so on.

Also belonging to the functionality of a conventional PCDU controller according to FIG. 1—which is also integrated in the combined controller—is controlling the electrical power supply and their power electronics in a satellite for distributing electrical energy to one or more supply buses and the control of the associated circuit-breakers of electrical loads of the satellite.

The combined controller can be optionally integrated in the OBC, in the PCDU, or even in a separate housing. The outlay for the wiring between the OBC and PCDU is practically minimal if the integration takes place in the PCDU, which is why this is also depicted in such a manner in FIG. 3. However, this solution is not mandatory.

In a conventional OBC/PCDU architecture according to FIG. 1, the emergency shutdown commands from the ground run on the lines, drawn in a dotted manner, between the CPDU and PCDU on analog connections, since this represents a standardized interface. The combined controller is of course a purely digital module and therefore enables the emergency shutdown command to be received directly as a tele-command packet digitally from the decoder board. This further simplifies the architecture.

Another embodiment of the invention relates to a constructional component pair consisting of the OBC and PCDU for issuing commands to a satellite and the control of its energy supply with
  OBC constructional components, which include all the usual OBC constructional components as they are used in conventional architectures, for controlling satellite equipment, storing data, decoding tele-commands, and generating telemetry data as well as for the internal power supply,
  PCDU constructional components, which include all the usual PCDU constructional components as they are used in conventional architectures, in particular input lines from solar panels, in-/output lines to the battery, a PCDU power electronics system for distributing electrical energy to one or more supply buses and with PCDU circuit-breakers for turning on/off electrical loads of the satellite at one of the supply buses, and
  two redundant multifunctional controllers according to the invention and as described herein with reconfiguration functions for monitoring the correct functioning of components of an onboard computer of the satellite and for switching over between redundant components and/or reconfiguring components of the onboard computer and/or turning off electrical loads of the satellite in the event of a malfunction, and control functions for controlling the current distribution to satellite components.

Lastly, an embodiment of the invention relates to an OBC/PCDU combination with such a combined controller, in particular for miniature satellites, for controlling the functions of the satellite, for supplying electrical energy to the electrical loads of the satellite, for controlling the supply of electrical energy in a satellite, and for monitoring the satellite onboard computer according to the invention and as described above.

Another embodiment of the invention relates to a satellite, in particular a miniature satellite, with a transceiver for receiving signals via radio, an onboard computer for controlling functions of the satellite, a solar panel for supplying electrical energy to electrical loads of the satellite, a battery for supplying electrical energy to the electrical loads of the satellite, and a device for commanding the satellite and controlling its energy supply according to the invention and as described above.

Additional advantages and application possibilities of the present invention emerge from the following description in connection with the embodiments depicted in the drawings.

BRIEF DESCRIPTION OF THE DRAWING FIGURES

The terms and assigned reference signs provided in the list of reference signs cited at the end are used in the description, the claims, the abstract, and the drawings:

DETAILED DESCRIPTION

In the following description, identical, functionally identical, and functionally related elements may be furnished with the same reference sign. Absolute values hereafter are provided only for example purposes and shall not be understood as limiting the invention.

Figure 1:
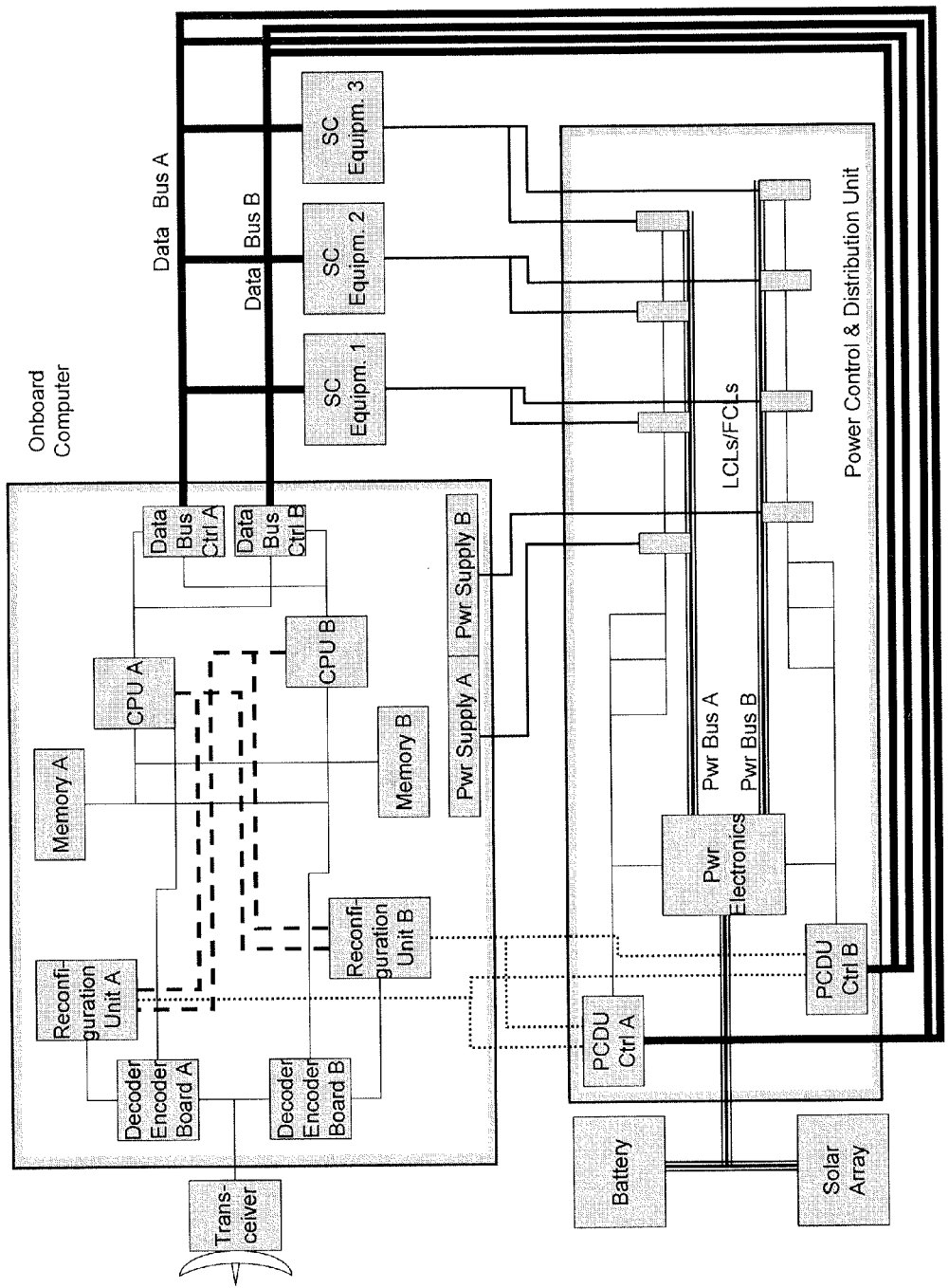
FIG. 1 depicts a wiring diagram of system components of a satellite with a conventional architecture for OBC and PCDU.

The OBC and PCDU are key components for the control and safety on board of a satellite. Therefore, all components in conventional satellites are each designed in a redundant manner and cross-coupled within the OBC and PCDU. FIG. 1 depicts a wiring diagram of system components of a satellite, including the OBC and PCDU, with redundant components that are labeled as A and B versions.

For example within the OBC, process module CPU A can be operated with memory module Memory A or B. In the standard configuration, the A modules are generally used. Of the submodules in the OBC, the most important types are listed in FIG. 1 only for example purposes; for example, there are several types of memory modules (PROM, RAM, safeguard memory, and so on). Internal clocks, clock strobe splitters, etc. are also not depicted in FIG. 1, yet are subject to the same redundancy switchover concepts.

In the following description, it is now assumed that only A modules will be used. For example, to start up a payload, such as spacecraft equipment 1 (SC Equipm. 1), the satellite receives commands on a transceiver via radio that are decoded in the decoder/encoder board A, with normal commands being forwarded to the OBSW, which is executed by CPU A, on the processor board of the OBC.

The OBSW initially actuates the active PCDU controller PCDU Ctrl A of the PCDU by means of data bus controller Bus Ctrl A and the data bus controlled by the data bus controller to supply the aforementioned payload spacecraft equipment 1 with electricity from the solar array or the battery.

According to the actuation, PCDU controller PCDU Ctrl A closes the LCL/FCL switch on each active power bus Pwr Bus A so that SC Equipm. 1 is supplied with electrical energy from the solar array or the battery via the power electronics module. Only then can the payload SC Equipm. 1 payload itself be commanded by the OBC via bus controller A. The OBSW delivers telemetry of the payload back to the active encoder decoder/encoder board A to transmit it with the transceiver via radio signals back to earth.

The functions of the decoder/encoder boards A and B, the reconfiguration units A and B, and the PCDU controllers A and B are described below in the event of a malfunction on board the satellite for various types of malfunctions:

Malfunction Type 1: Malfunctions that the Operating OBSW of the Satellite can Identify:

In such a malfunction—when for example bus controllers A or B exhibits sporadic interruptions or the OBSW receives EDAC error bit messages from memory chips—it sends a high-priority command to the active reconfiguration unit A of the OBC, which then initiates the hardware switchover—e.g., to data bus controller B or memory module B. If necessary, the OBSW must be re-booted after a hardware reconfiguration—also initiated by reconfiguration unit A. In other words, for malfunction type 1, reconfiguration is initiated by the OBSW.

Malfunction Type 2: Crash of the OBSW—Auto-Reconfiguration:

In the event that the OBSW crashes, at least the active CPU must receive a reset command to reboot, or in the event of an OBSW crash due to hardware errors, the corresponding components of the OBC must be reconfigured on the B-side (memory, CPU, etc.). In addition, in the event of an OBSW crash, the position of the satellite and the orientation of the solar panel to the sun are no longer controlled so that superfluous loads (e.g., operating payloads) must be turned off. However, because the OBSW no longer operating, it cannot command the shutdown via data bus controllers A or B and the data bus.

Therefore, reconfiguration unit A cyclically monitors certain watchdog lines to determine whether the active CPUs of the computer (and if applicable other constructional components equipped with watchdog circuits) are still running correctly. In the absence of a watchdog signal, certain reconfigurations can be automatically executed. However, the scope is generally limited since a detailed troubleshooting analysis is not possible by the simple means on board the satellite. Therefore, more complex situations require a reconfiguration from the ground (see malfunction type 3). Therefore, for malfunction type 2, an autonomous reconfiguration (auto-reconfiguration) is executed on board, i.e., without external signaling.

Malfunction Type 3: Crash of the OBSW—Reconfiguration from the Ground:

Both tasks—OBC reconfiguration and emergency shutdown of loads—must be performed from the ground in this case. To do so, there are special high priority commands from the ground that are detected by decoder/encoder board A and B and are forwarded to active reconfiguration unit A or B, and not to the CPU of the computer. In this way, the hardware reconfiguration is triggered in the OBC, if it is necessary to initiate a reboot of the OBSW, and a special sub-unit of the reconfiguration unit known as a command pulse decoding unit (CPDU) transmits specially formatted analog pulse commands directly via separate lines to the PCDU controller, with which the emergency shutdown of loads and if applicable other electrical switchovers can be executed. In other words, for malfunction type 3, reconfiguration is initiated from the ground, i.e., by external signaling using special commands.

Malfunction Type 4: Power Shortage in the Satellite:

In the event of a power shortage of the satellite, for example when the satellite is located in the shadow of the earth and the battery does not have sufficient electrical energy to supply the satellite, the entire satellite, including the OBC, is shut down in an emergency by the active PCDU controller. When the satellite re-emerges out of the earth's shadow, and the input voltage from the solar array and battery to the PCDU rises again, the last active PCDU controller automatically activates itself and, with further increasing system voltage, successively turns on other satellite components—starting with the OBC. Then with its OBSW, it controls the startup of the other satellite components, e.g., of the position control equipment and so on until reaching a safe-mode configuration. The OBC is booted according to the settings of its reconfiguration unit. Even here, PCDU controllers and reconfiguration units interact again. Accordingly for malfunction type 4, a reboot and a reconfiguration of the OBC is initiated by the PCDU controller.

From the preceding description, it becomes clear that the two component types, the reconfiguration units of the OBC and the PCDU controllers, are extremely critical structural elements in relation to the correct functioning and reconfiguration of the satellite in the event of a malfunction. In the event of a malfunction, the mission of the satellite depends on the 100-percent functioning of these two components. Both component-types are therefore usually implemented in satellites without their own software as FPGA or directly as ASIC modules. However as a result, a large outlay for testing independent modules and also for system tests for their smooth interaction in all situations is required.

To decrease the implementation- and test-related outlay, these two components can be combined into a single component, a multifunctional controller that combines implementation of an OBC reconfiguration unit and a PCDU controller. The thusly created multifunctional controller can be installed in the PCDU housing or OBC housing, in a separate housing, or both units (PBC and PCDU) are combined with the multifunctional controller into a common unit in one housing.

Figure 2:
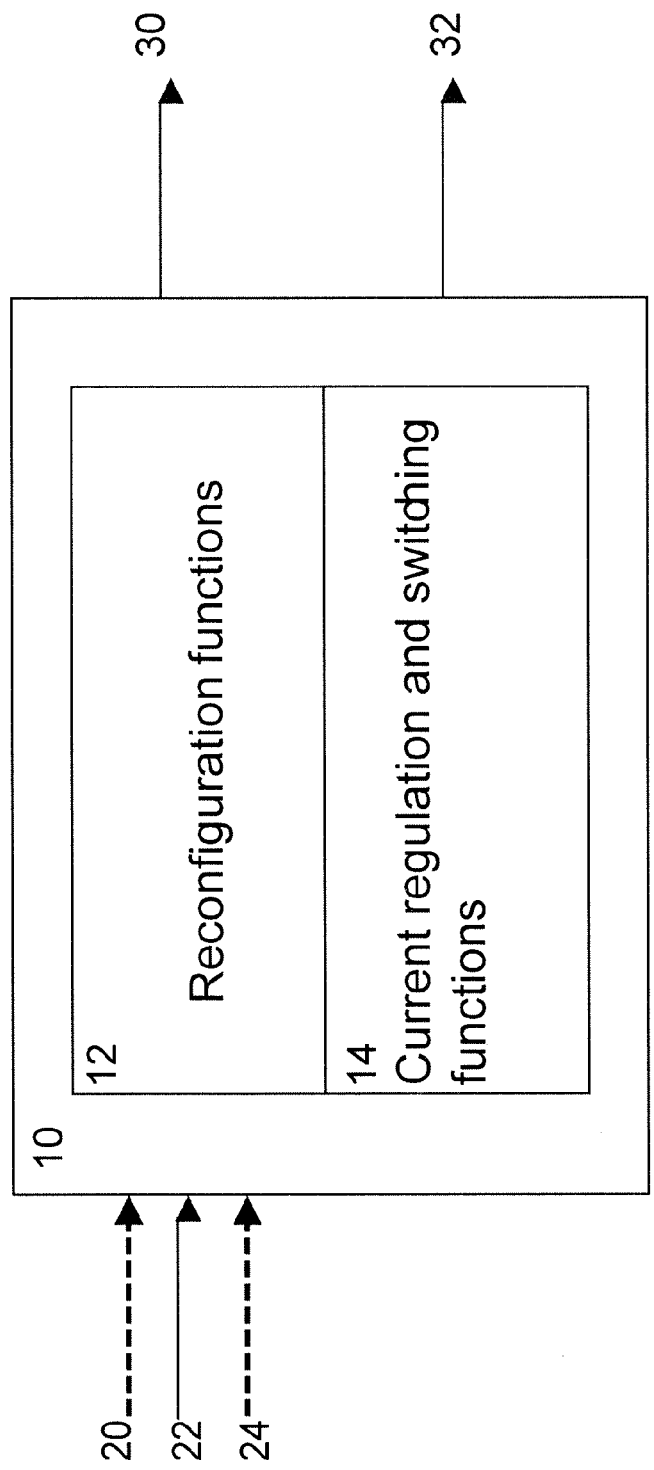
FIG. 2 depicts a wiring diagram of an embodiment of a multifunctional controller according to the invention.

FIG. 2 depicts a wiring diagram of such a multifunctional controller 10, which has reconfiguration functions 12 and current regulating and switching functions 14, which are both implemented in the same chip or on the same microcontroller and can access shared data and parameters. The multifunctional controller has several inputs 20, 22, and 24 for reconfiguration functions 12.

Inputs 20 are provided for triggering reconfiguration functions when receiving corresponding commands such as the high-priority command (cf. malfunction-type 1 above) and ensure that reconfiguration functions 12 initiate a reset of one or more OBC components via reset output 30 and if applicable also a hardware switchover to redundant OBC components via the current switching functions.

Inputs 22 are provided for monitoring signals from the OBC such as watchdog signals (see malfunction-type 2 above) and, when a monitoring signal is absent, they serve to execute a reconfiguration of the corresponding components of the OBC by issuing corresponding signals to outputs 30 and 32.

Inputs 24 are provided for commands from decoder modules for the hardware reconfiguration of the OCB and/or emergency shutdown of electrical loads of the satellite and/or electrical switchovers, as well as the special high-priority commands from the ground (see malfunction type 3 above) and serve to trigger a hardware reconfiguration of OBC components or initiate a reboot of the OBSW by issuing corresponding signals to outputs 30 and 32. Furthermore, by means of data coming in through inputs 24 via current switching functions 14, an emergency shutdown of loads and, if necessary other electrical switchovers, can be executed by issuing corresponding control signals at output 32. In doing so, the commands at inputs 24 no longer have to be implemented as analog pulse commands, as is normally required in a design with the reconfiguration unit and the PCDU controller as independent modules. The signal-types on inputs 24 can be forwarded directly in a digital form from the decoder board to the multifunctional controller.

The current regulation and switching functions also take over the typical PCDU function of monitoring the electric power supply of the satellite (see malfunction type 4 above) and serve to turn off satellite components in the event of insufficient electrical energy and/or supply satellite components with electrical energy by issuing corresponding control signals at output 32, as soon as a sufficient supply of electric energy prevails in the satellite (for example, when, after a complete blackout of the electrical energy supply in the earth's shadow, the solar panel supplies sufficient electrical energy once again).

Figure 3:
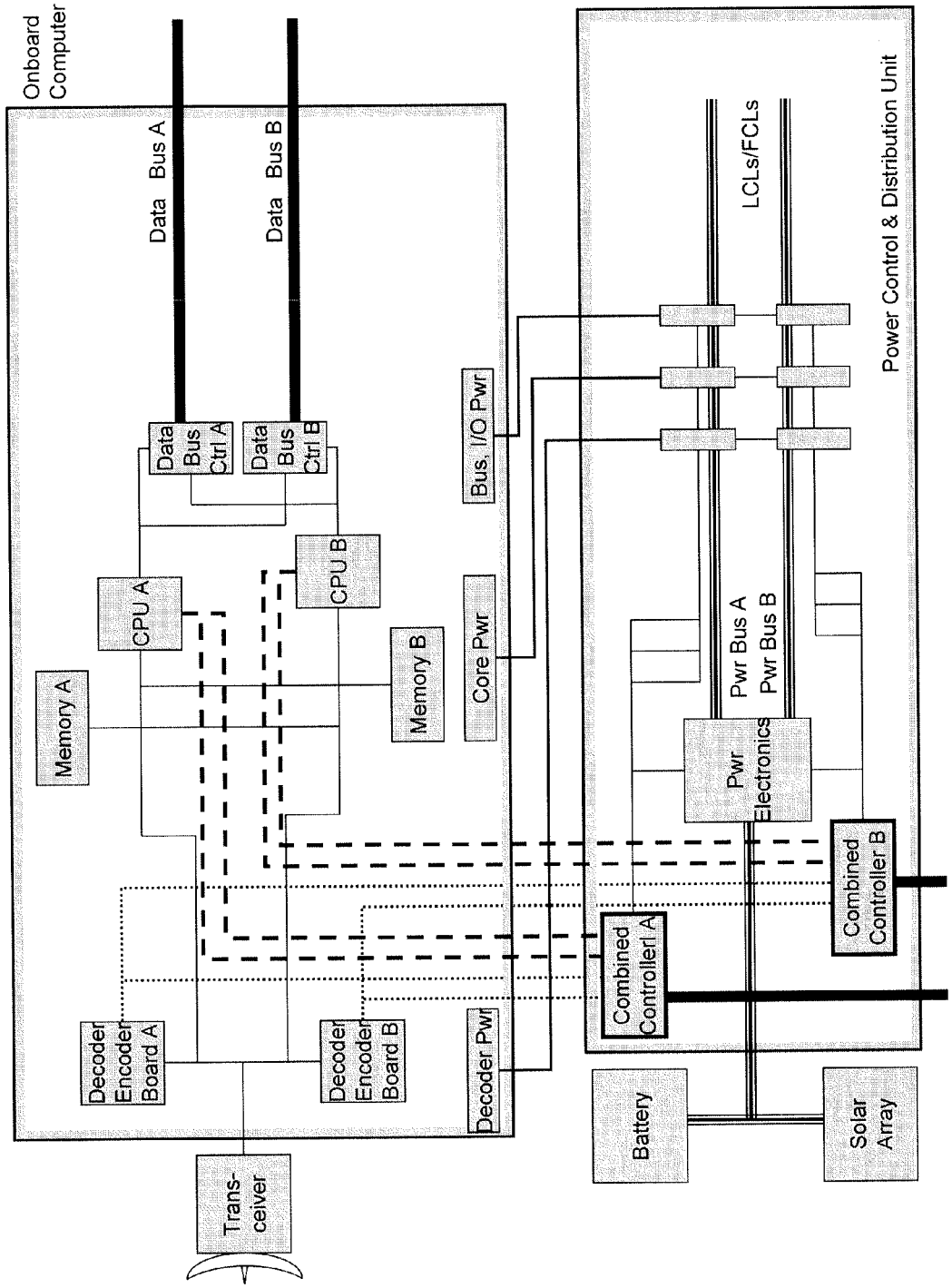
FIG. 3 depicts a wiring diagram of system components of a satellite with an OBC and PCDU and a multifunctional controller (combined controller) according to the invention.

FIG. 3 depicts a wiring diagram of system components of a satellite with an OBC and PCDU and the multifunctional controller according to the invention, that is designated in FIG. 3 as combined controller A and combined controller B. In contrast to the architecture depicted in FIG. 1, the architecture depicted in FIG. 3 implements the reconfiguration units from the OBC and the PCDU controller units from the PCDU of FIG. 1 in multifunctional combined controllers A and B, which is shown in a simpler construction.

In regard to the architecture of FIG. 3, when operating in normal mode, the OBSW of the computer can continue issuing commands to the PCDU control functions implemented in multifunctional combined controller A and combined controller B via the data buses connected to data bus controllers A and B (for clarity's sake, the connections are not depicted in FIG. 3, nor are the data bus connections to other satellite equipment).

The OBC reconfiguration takes place as normal by means of power resets or soft reset commands sent to the corresponding OBC submodules—now by the multifunctional combined controllers.

For example, each OBC decoder board A or B can be separately supplied with power from the combined controllers, every OBC core board A or B with CPU, PROM, RAM, clock module, data bus and/or every I/O module A or B, and so on. The seemingly additionally created electrical switching outlay in the PCDU was hidden in the architecture of the OBC from FIG. 1 in each of its reconfiguration units and thus there no additional outlay if the overall architecture is viewed as being OBC plus PCDU.

The function of the multifunctional controllers in the various malfunction instances explained above is now as follows:

In a type 1 malfunction event, the operating OBC OBSW triggers in a CPU via corresponding connections—depicted in dashed lines again in FIG. 2—the reconfiguration functions in active multifunctional controllers, for example combined controller A. To that end, the connections go from the OBC to reconfiguration trigger inputs 20 of the two multifunctional controllers.

In a type 2 malfunction event, the auto-reconfiguration is performed, without any changes, only by the active multifunctional controller, e.g., combined controller A. The watchdog lines, which previously ran in the OBC to the reconfiguration units, now go to inputs 22 of the multifunctional controller.

In a type 3 malfunction event, the decoder/encoder boards A and B now trigger via connections the reconfiguration functions in the active multifunctional controller, for example combined controller A. To this end, the connections go from the decoder/encoder boards A and B to the hardware reconfiguration and emergency shutdown command inputs 24 of the two multifunctional controllers, depicted in dotted lines again in FIG. 2.

In a type 4 malfunction event (insufficient power), the PCDU control functions of the multifunctional controller continue to control the reboot of the satellite unchanged from the typical architecture. As an additional function, the multifunctional controllers also monitor the power electronics, the electric energy supply from the solar panel and the battery of the satellite, as well as the voltage regulation on the power busbar A and B. In the event of a shortage, the control functions turn off individual components.

A few advantages offered by the concept of combining the OBC reconfiguration unit and the PCDU controller, are listed briefly below:

Only one critical controller module must be manufactured, for example as a chip (FPGA or ASIC).

Only one chip firmware (e.g., a chip IP core) must be implemented.

All functions can be tested directly together, since they are in one firmware and one chip. To this end, only one firmware development/test environment is required and the chip itself. Multiple constructional components (separate OBC and PCDU) do not have to be wired together for system tests. Complex system tests for the interaction of a typical OBC reconfiguration unit and the PCDU controllers for various malfunction events, such as failure detection, isolation, and recovery FDIR are simplified. Certain special situations may even be omitted entirely.

For the OBSW (onboard software) design, there are only minimal changes for triggering the reconfigurations compared to the typical architecture and no additional outlay.

The decoder/encoder boards, including the wiring, remain identical to the typical architecture.

The analog CPDU as a sub-unit of the reconfiguration unit, with which analog switching commands are sent to the PCDU controller, can be dispensed with entirely. After decoding, the corresponding HPCI class of emergency commands is sent via normal, digital connections to the combined controller. The CPDU counterpart in the PCDU controller, the analog LCL switching electronics in the PCDU can also be dispensed with.

These simplifications reduce the manufacturing and inspection costs for the tandem OBC+PCDU significantly, which makes the architecture especially interesting for low-cost missions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS AND ACRONYMS

10 Multifunctional controller
12 Reconfiguration functions
14 Current regulation and switching functions
20 Reconfiguration and trigger inputs
22 Watchdog inputs
24 Hardware reconfiguration and emergency shutdown command inputs
30 Reset outputs
32 Energy supply control signals
ASIC Application Specific Integrated Circuit
CPDU Command Pulse Decoding Unit
CPU Central Processing Unit
FDIR Failure Detection, Isolation and Recovery
(F)PGA (Field-) Programmable Gate Array
OBC Onboard Computer
OBSW Onboard Software
PCDU Power Control & Distribution Unit
PROM Programmable Read Only Memory
RAM Random Access Memory
SC Spacecraft

What is claimed is:

1. A multifunctional controller for a satellite, comprising:
    reconfiguration hardware operable to reconfigure components of an onboard computer, and to shutdown electrical loads of the satellite, including redundant central processing units of an on-board computer of the satellite, in an event of a malfunction; and
    power control hardware operable to control distribution of energy to satellite
    components, including controlling an electrical power supply and power electronics of the electrical power supply that distribute electrical energy to one or more power supply busses,
    wherein a single chip, comprised of the reconfiguration hardware together with the power control hardware, is arranged separate from the redundant central processing units of the on-board computer, and
    wherein the single chip is configured to cyclically receive commands as data packets from a corresponding one of the redundant central processing units via a single respective data bus.

2. The multifunctional controller according to claim 1, wherein the reconfiguration hardware is configured to enable power resets or soft reset commands to be performed for reconfiguring components of the onboard computer and to be issued to the corresponding components.

3. The multifunctional controller according to claim 1, further comprising:
    an input configured to trigger the reconfiguration hardware upon receiving corresponding commands.

4. The multifunctional controller according to claim 1, further comprising:
    an input configured to provide signals from the onboard computer, which are monitored by the multifunctional controller and the multifunctional controller is configured so that when a missing monitoring signal is detected a reconfiguration of the corresponding components of the onboard computer is implemented.

5. The multifunctional controller according to claim 1, further comprising:
    an input configured to receive commands from decoder modules for hardware reconfiguration of the onboard computer, emergency shutdown of electrical loads of the satellite, or electrical switchovers.

6. A device for commanding a satellite and controlling its energy supply, the device comprising:
    an on-board computer comprising redundant central processing units and configured to control satellite equipment, store data, decode tele-commands, generate telemetry data, and control an internal power supply;
    a power control and distribution unit, which includes input lines from a solar panel, input/output lines to a battery, a power control and distribution unit power electronics system configured to distribute electrical energy to one or more supply buses, and power control and distribution unit circuit-breakers configured to turn off/on electrical loads of the satellite at one of the supply buses; and two redundant multifunctional controllers, each of which is a single chip separate from the redundant central processing units of the on-board computer, and each of which includes:

reconfiguration hardware operable to monitor correct functioning of components of the onboard computer of the satellite, to switch-over between redundant components in the event of a malfunction, to reconfigure components of the onboard computer in the event of a malfunction, and to shutdown electrical loads of the satellite, including the redundant central processing units of the on-board computer, in an event of a malfunction, and power control hardware operable to control current distribution to components of the satellite, including controlling an electrical power supply and power electronics of the electrical power supply that distribute electrical energy to one or more supply busses, wherein each single chip is configured to cyclically receive commands as data packets from a corresponding one of the redundant central processing units via a single respective data bus.

7. A satellite, comprising:
a transceiver configured to receive radio signals;
a solar panel configured to supply electrical energy to electrical loads of the satellite;
a battery configured to supply electrical energy to the electrical loads of the satellite; and
a device for commanding a satellite and controlling its energy supply, the device comprising:
an on-board computer comprising redundant central processing units and configured to control satellite equipment, store data, decode tele-commands, generate telemetry data, and control an internal power supply;
a power control and distribution unit, which includes input lines from a solar panel, input/output lines to a battery, a power control and distribution unit power electronics system configured to distribute electrical energy to one or more supply buses, and power control and distribution unit circuit-breakers configured to turn off/on electrical loads of the satellite at one of the supply buses; and
two redundant multifunctional controllers, each of which is a single chip separate from the redundant central processing units of the on-board computer, and each of which includes:
reconfiguration hardware operable to monitor correct functioning of components of the onboard computer of the satellite, to switch-over between redundant components in the event of a malfunction, to reconfigure components of the onboard computer in the event of a malfunction, and to shutdown electrical loads of the satellite, including the redundant central processing units of the on-board computer, in an event of a malfunction, and
power control hardware operable to control current distribution to components of the satellite, including controlling an electrical power supply and power electronics of the electrical power supply that distribute electrical energy to one or more supply busses,
wherein each single chip is configured to cyclically receive commands as data packets from a corresponding one of the redundant central processing units via a single respective data bus.

8. The multifunctional controller according to claim 1, wherein the multifunctional controller is integrated in a power control and distribution unit.

9. The multifunctional controller according to claim 1, wherein the multifunctional controller is arranged in a housing that is separate from a power control and distribution unit and an onboard computer.

10. The device according to claim 6, wherein the multifunctional controller is integrated in the power control and distribution unit.

11. The device according to claim 6, wherein the multifunctional controller is arranged in a housing that is separate from the power control and distribution unit and the onboard computer.

12. The satellite according to claim 7, wherein the multifunctional controller is integrated in the power control and distribution unit.

13. The satellite according to claim 7, wherein the multifunctional controller is arranged in a housing that is separate from the power control and distribution unit and the onboard computer.

14. The device according to claim 6, wherein the reconfiguration hardware is configured to enable power resets or soft reset commands to be performed for reconfiguring components of the onboard computer and to be issued to the corresponding components.

15. The device according to claim 6, wherein each of the two redundant multifunctional controllers comprise:
an input configured to trigger the reconfiguration hardware upon receiving corresponding commands.

16. The device according to claim 6, wherein each of the two redundant multifunctional controllers comprise:
an input configured to provide signals from the onboard computer, which are monitored by the multifunctional controller and the multifunctional controller is configured so that when a missing monitoring signal is detected a reconfiguration of the corresponding components of the onboard computer is implemented.

17. The satellite according to claim 7, wherein the reconfiguration hardware is configured to enable power resets or soft reset commands to be performed for reconfiguring components of the onboard computer and to be issued to the corresponding components.

18. The satellite according to claim 7, wherein each of the two redundant multifunctional controllers comprise:
an input configured to trigger the reconfiguration hardware upon receiving corresponding commands.

19. The satellite according to claim 7, wherein each of the two redundant multifunctional controllers comprise:
an input configured to provide signals from the onboard computer, which are monitored by the multifunctional controller and the multifunctional controller is configured so that when a missing monitoring signal is detected a reconfiguration of the corresponding components of the onboard computer is implemented.

20. The multifunctional controller according to claim 1, wherein the data packets contain at least one of tele-commands and power switch commands.

* * * * *